(12) United States Patent
Rajkotia (10) Patent No.: US 7,016,692 B2
(45) Date of Patent: Mar. 21, 2006

(54) TECHNIQUE TO FACILITATE LOCATION DETERMINATION OF WIRELESS DATA CALLS

(75) Inventor: Purva R. Rajkotia, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 557 days.

(21) Appl. No.: 10/102,292

(22) Filed: Mar. 20, 2002

(65) Prior Publication Data

US 2004/0203844 A1    Oct. 14, 2004

(51) Int. Cl.
*H04Q 7/20*    (2006.01)

(52) U.S. Cl. .............................. 455/456.2; 455/404.2; 455/457

(58) Field of Classification Search ............. 455/456.1, 455/456.5, 456.6
See application file for complete search history.

(56) References Cited

U.S. PATENT DOCUMENTS

| | | | |
|---|---|---|---|
| 5,903,844 A * | 5/1999 | Bruckert et al. | 455/456.2 |
| 6,442,392 B1 * | 8/2002 | Ruutu et al. | 455/456.1 |
| 6,459,903 B1 * | 10/2002 | Lee | 455/456.1 |
| 6,658,258 B1 * | 12/2003 | Chen et al. | 455/456.1 |
| 6,785,550 B1 * | 8/2004 | Bi et al. | 342/457 |
| 2002/0122003 A1 * | 9/2002 | Patwari et al. | 342/450 |
| 2002/0132623 A1 * | 9/2002 | Kingdon | 455/456 |
| 2003/0036390 A1 * | 2/2003 | Villier et al. | 455/456 |
| 2003/0222819 A1 * | 12/2003 | Karr et al. | 342/457 |
| 2004/0132443 A1 * | 7/2004 | Klein et al. | 455/424 |

* cited by examiner

*Primary Examiner*—W. R. Young
*Assistant Examiner*—Dai Phuong (57) ABSTRACT

A channel for location estimation based on a wireless data communication from a mobile station is selected based on one or more of signal duration, variability and power level/signal-to-noise ratio of at least a portion of the wireless signals transmitted on the selected channel by the mobile station under the applicable configuration. Acceptable channels reducing location estimation error over alternatives include the access channel for Short Message Service (SMS) systems, the reverse pilot channel or the enhanced access channel for IS2000 systems, and the reverse link traffic channel for 1×EV-DO or 1×EV-DV systems. Location estimation is performed on wireless data communications on the selected channel.

14 Claims, 4 Drawing Sheets

TECHNIQUE TO FACILITATE LOCATION DETERMINATION OF WIRELESS DATA CALLS

TECHNICAL FIELD OF THE INVENTION

The present invention is directed, in general, to location estimation for a wireless communications mobile unit and, more specifically, to location estimation for wireless data communications.

BACKGROUND OF THE INVENTION

Location estimation of a wireless communications mobile unit, such as in locating a mobile unit for emergency 911 (E911) calls, is a challenging task for wireless communications. Various location estimation mechanisms have been proposed or implemented for wireless voice communications, which have been the focus of location estimation developments efforts to date.

However, wireless data communications such as text messaging and simple information services through the Short Message Service (SMS) or the Wireless Application Protocol (WAP) has recently experienced dramatic worldwide growth. The proliferation of wireless data communications is likely to continue as $3^{rd}$ Generation (3G) telephones and systems are developed and implemented, including the Telecommunications Industry Association (TIA) IS-2000 standard defining backward-compatible extension of existing CDMA communications and the proposed International Telecommunication Union (ITU) CDMA2000 1x Evolution for Data Only (1xEV-DO) and CDMA2000 1x Evolution for Data & Voice (1xEV-DV) standards.

There is, therefore, a need in the art for location estimation techniques for mobile stations employing wireless data communications.

SUMMARY OF THE INVENTION

To address the above-discussed deficiencies of the prior art, it is a primary object of the present invention to provide, for use in a location estimator for wireless communications systems, selection of a channel for location estimation based on a wireless data communication from a mobile station based on one or more of signal duration, variability and power level/signal-to-noise ratio of at least a portion of the wireless signals transmitted on the selected channel by the mobile station under the applicable configuration. Acceptable channels reducing location estimation error over alternatives include the access channel for Short Message Service (SMS) systems, the reverse pilot channel or the enhanced access channel for IS2000 systems, and the reverse link traffic channel for 1xEV-DO or 1xEV-DV systems. Location estimation is performed on wireless data communications on the selected channel.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1A–1C through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1A:
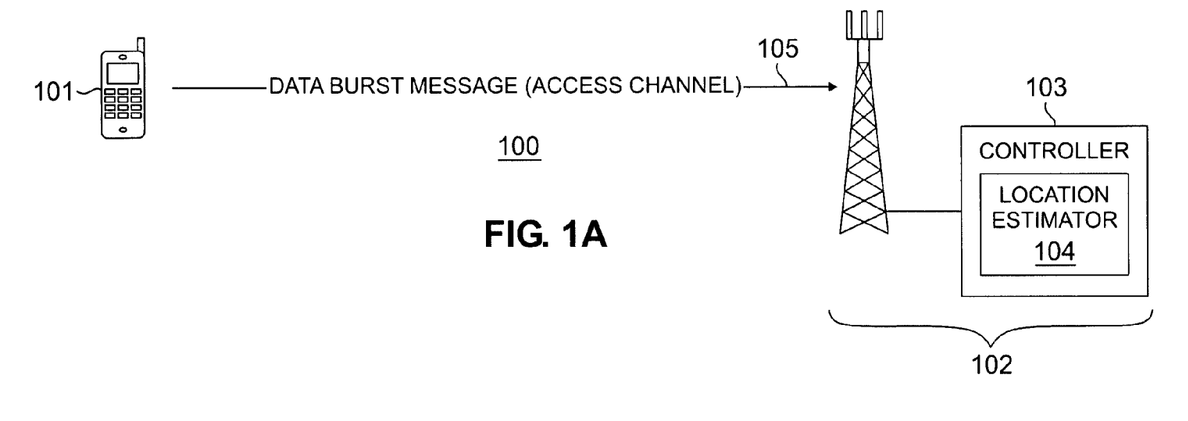
FIGS. 1A–1C depict wireless communications systems implementing location estimation based upon wireless data communications according to various embodiments of the present invention.
Figure 1B:
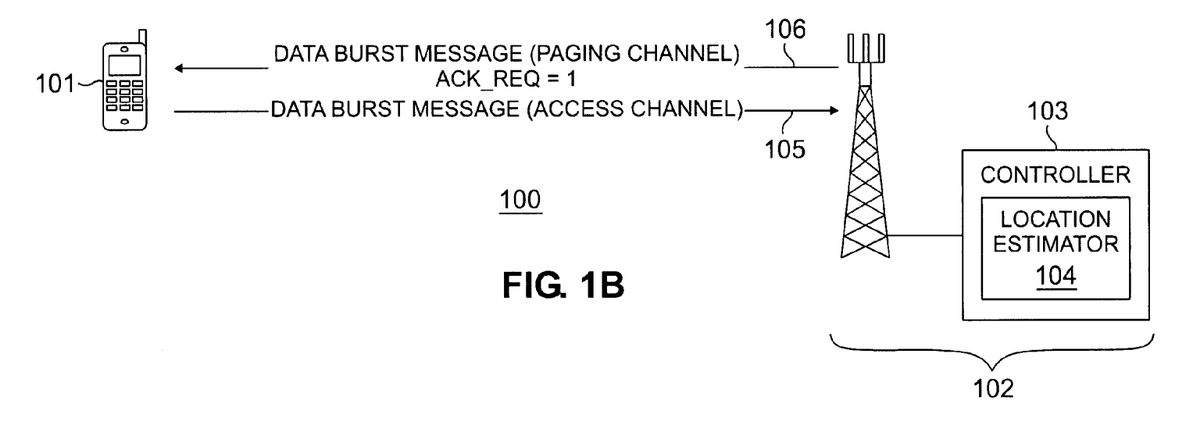
Figure 1C:
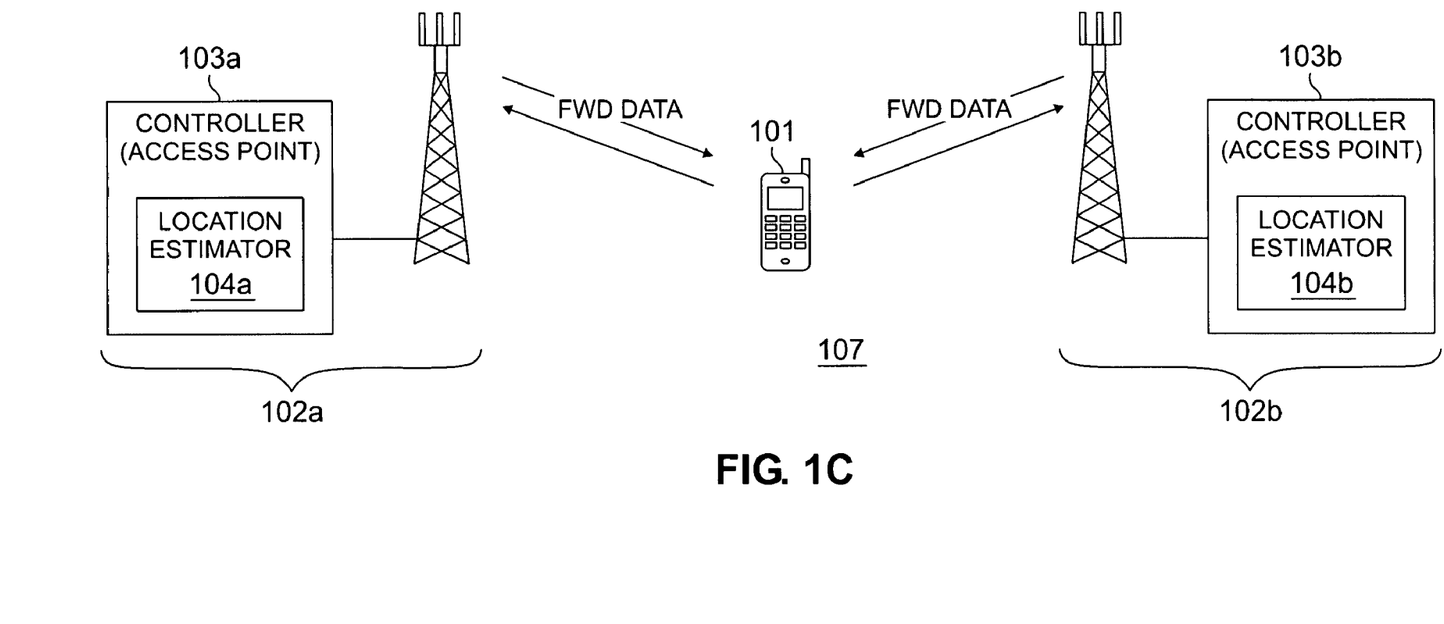
Figure 2:
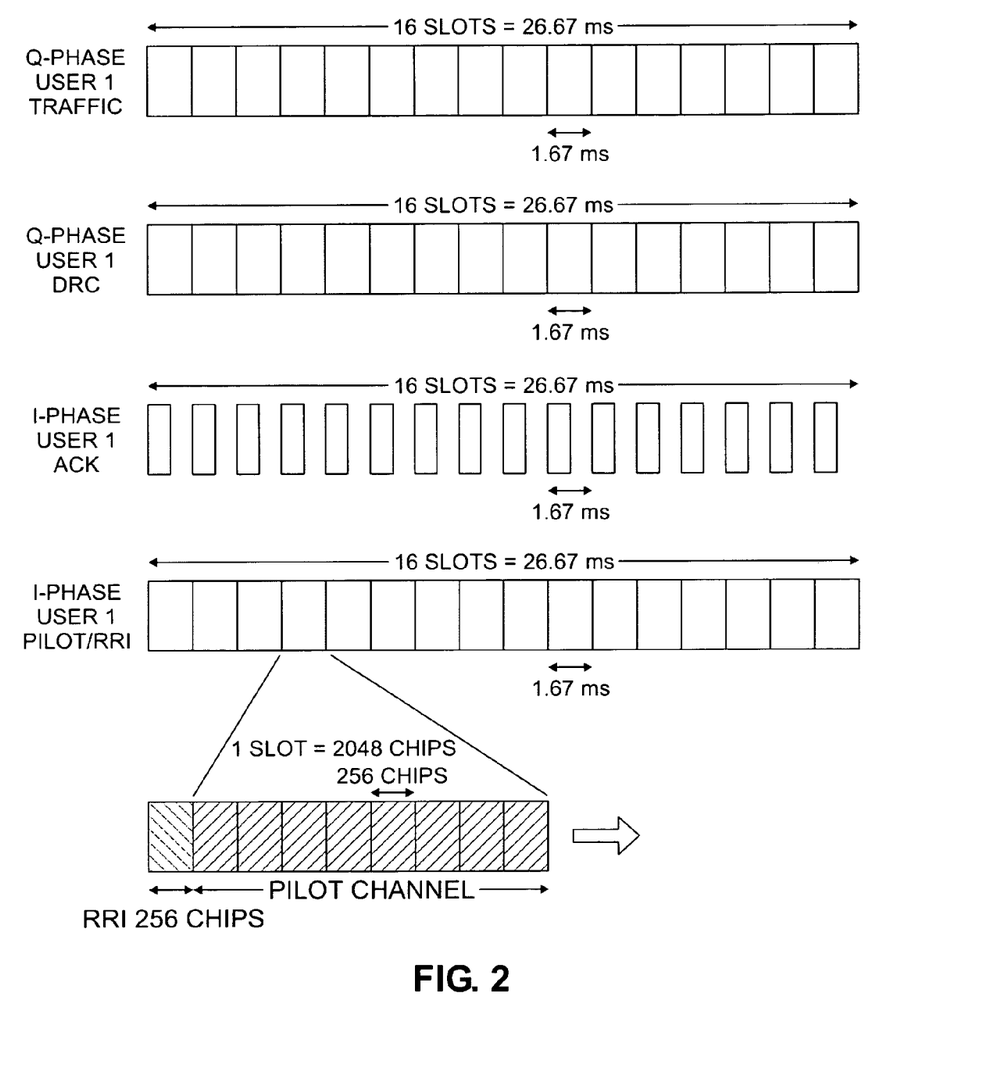
FIG. 2 is an illustration of a portion of a reverse link channel structure employed in location estimation based upon wireless data communications according to one embodiment of the present invention.

FIGS. 1A through 1C depict wireless communications systems implementing location estimation based upon wireless data communications according to various embodiments of the present invention. Wireless communications system 100 includes a mobile station 101 capable of selective data communications with at least one base transceiver station (BTS) or base station 102 via a wireless communications interface, such as a code division multiple access (CDMA) radio system.

In FIGS. 1A and 1B, base station 102 includes a controller 103 having location estimator functionality 104 operable therein. Utilizing location estimator 104, base station 102 performs location estimation based on wireless data communications with mobile station 101 utilizing one of the techniques described in further detail below.

As described above, various techniques are employed to estimate the location of a mobile unit for voice communications, which may generally be divided into network-based location techniques and handset-based location techniques. In network-based location techniques, the messages sent by the mobile station (reverse link) are gathered by the location-determining system and processed for location estimation, a process employed regardless of the network location technology—e.g., Angle of Arrival (AOA), Time Difference of Arrival (TDOA), Frequency Difference of Arrival (FDOA), or combinations thereof.

Network-based location estimation technology vendors have proven that processing performed on the control channel frames produces more accurate results, due at least in part to the presence of less signal variance, the constancy of power and/or the longer average duration (allowing coherent integration) of signals on the control channels. The difference in results may be seen from the signal-to-noise ratio SNR formula:

$$SNR = L\rho\sqrt{2BT},$$

where L is a digital loss factor having a positive value less than or equal to 1, $\rho$ is the correlation amplitude derived from the geometric mean of the ratio of the source antenna temperature to system temperature, B is the bandwidth in Hertz (Hz), and T is the coherent integration time in seconds. Moreover, the root mean square (RMS) location error $LE_{RMS}$ is an inverse function of the signal-to-noise ratio SNR, coherent integration time T and bandwidth B given (in Cramer Rao bound form) by:

$$LE_{RMS} = \frac{\sqrt{12}}{2\pi B\sqrt{2BTSNR}}.$$

Therefore correlation processing on the control channels (rather than the traffic channels) is preferred for location estimation.

In the present invention, location estimation based on wireless data communications employs the same fundamental philosophy utilized for voice calls, and does not require a completely new location estimation algorithm. Nor does the present invention require any substantial changes to the hardware or software of either the base station or the mobile station.

FIGS. 1A and 1B depict a wireless communications system implementing location estimation based upon wireless data communications according to one embodiment of the present invention. In the embodiment of FIGS. 1A–1B, Short Message Service (SMS) capabilities are assumed to exist between the mobile station 101 and the base station 102. When mobile station 101 attempts to originate an SMS call, the required data burst message 105 is sent on the access channel defined by the SMS standard. The same access channel information may be processed for location estimation for mobile-originated SMS calls.

Location estimation for SMS mobile-originated calls, illustrated in FIG. 1A, is easier than location estimation for SMS mobile-terminated calls, illustrated in FIG. 1B. Once the message reaches the mobile station 101 in the case of mobile-terminated SMS calls, no information is available on the reverse channel to the location estimator for location estimation processing. Therefore, the one bit acknowledgement required ($ACK_{13}$ REQ) indicator field on the data burst message 106 transmitted by the base station 102 on the paging channel is set to 1 for mobile-terminated SMS calls (illustrated in FIG. 1B) in the present invention. When mobile station 101 receives the data burst message 106 with the ACK_REQ field set to 1, the mobile station 101 responds with a data burst message 105 on the access channel.

Thus, in mobile-originated SMS calls, the location estimator 104 employs the data burst message 105 on the access channel for location estimation. In mobile-terminated SMS calls, the base station 102 sends a data burst message in the paging channel having, along with other fields, an ACK_REQ field set to 1 to indicate that acknowledgement by the mobile station 101 is required. The acknowledgement message sent by the mobile station 101 is also a data burst message 104 sent on the (reverse) access channel.

When the base station 102 receives a message with the valid acknowledgement (VALID_ACK) set to 1, indicating a valid acknowledgement, the base station 102 employs the received acknowledgement type (ACK_TYPE), acknowledgement sequence (ACK_SEQ) and mobile station identification fields to determine what message is being acknowledged, and employs acknowledgement of the paging channel data burst message 105 for location estimation. Because the data burst message 105 on the access channel triggered by the data burst message 106 on the paging channel is a contiguous message, the resulting larger duration and coherent integration time produces a lower location estimation RMS error.

FIG. 1C depicts a wireless communications system implementing location estimation based upon wireless data communications according to another embodiment of the present invention. In the embodiment of FIG. 1C, 3G (e.g., 1xEV-DO or 1xEV-DV) capabilities are assumed to exist between the mobile station 101 and the base stations 102a–102b. In addition to the legacy channels, IS2000 and ancillary standards include the enhanced access channel and the reverse pilot channel, which may be exploited as described below for location estimation.

For 3G systems, the reverse pilot channel is an unmodulated spread spectrum signal utilized to assist the base station 102 in detecting transmissions by mobile station 101. The reverse pilot channel is employed when the enhanced access channel, the reverse common channel, or the reverse traffic channel are enabled with either of radio configuration 3 and 6, and also during the enhanced access channel preamble, the reverse common control channel preamble, and the reverse traffic channel preamble.

The reverse pilot channel is always present as long as the mobile station 101 is on and operating in the RC3–RC7 configuration. Therefore, apart from synchronization between the mobile station 101 and the base station, coherent demodulation may also be employed for location estimation processing, and processing on the reverse pilot channel provides a very long coherent integration time, which in turn reduces the location estimation RMS error.

In the case of the reverse pilot channel, the mobile station is required to maintain the ratio of mean code channel output power to mean pilot channel output power to within ±0.25 decibels (dB) of the number specified by:

0.125× Nominal_Attribute_Gain (Rate, Frame Duration, Coding)

+ Attribute_Adjustment_Gain (Rate, Frame Duration, Coding)

+ Reverse_ChannelAdjustment_Gain (Channel)
− Multiple_Channel_Adjustment_Gain (Channel)
+RLGAIN_TRAFFFIC_PILOT
+RLGAIN_SCH_PILOT (Channel).

The details and values of each of these parameters is specified in IS-2000 revision 2.1.

The power value of the reverse pilot channel, while varied depending on the data rate and of the other reverse link channels, is sufficient for a long coherent integration time and SNR estimation, and to help in overall reduction of the location estimation error. Moreover the power level, and therefore the SNR, is sufficient to help in overall reduction of location estimation error. Accordingly, location estimator 104a (or 104b) may employ the reverse pilot channel for location estimation.

The enhanced access channel is employed in 3G systems by the mobile station 101 to initiate communication with the base stations 102a–102b or to respond to a mobile station directed message. The enhanced access channel may be employed in three possible modes: Basic Access Mode, Power Controlled Access Mode, and Reservation Access Mode. Power Controlled Access Mode and Reservation Access Mode may operate on the same enhanced access channel, while Basic Access Mode operates on a separate enhanced access channel.

The frame structure employed on the enhanced access channel is shown in Table I below:

TABLE I

| Information | F | T |
| --- | --- | --- |

Where F is the frame quality indicator, a cyclic redundancy check (CRC) field, and T is the encoder tail bits field. A summary of possible frame structures for the enhanced access channel is shown below in Table II:

TABLE II

| Frame Length (msec) | Frame Type | Trans. Rate (bps) | No. of Bits per Frame | | | |
| --- | --- | --- | --- | --- | --- | --- |
| | | | Total | Info. | F | T |
| 5 | Data | 9600 | 48 | 32 | 8 | 8 |
| 20 | Data | 9600 | 192 | 172 | 12 | 8 |
| 20 | Data | 19200 | 384 | 360 | 16 | 8 |
| 20 | Data | 38400 | 768 | 744 | 16 | 8 |
| 10 | Data | 19200 | 192 | 172 | 12 | 8 |
| 10 | Data | 38400 | 384 | 360 | 16 | 8 |
| 5 | Data | 38400 | 192 | 172 | 12 | 8 |

Usage of 20 millisecond (msec) frame lengths as compared to 5 msec frames can affect the location accuracy by an amount on the order of 25%, assuming all conditions are controlled and unchanged.

The power (and hence the SNR) of the enhanced access channel is on the same order as that of the access channel, although normally the access burst has greater power as compared to the remaining traffic channels and should therefore result in better location estimation. While the enhanced access frame structure has a variable size, frame sizes of at least 20 msec or greater present a good integration time.

In 1xEV-DO systems, the reverse link structure consists of a fixed size physical layer of packets having 16 slots and a 26.67 msec duration. 1xEV-DO utilizes a pilot-aided, coherently demodulated reverse link. Traditional power control mechanisms and soft handoffs are supported on the reverse link. A 1xEV-DO Access Terminal may transmit at rates from 9.6 kilo-bits-per-second (kpbs) to 153.6 kbps on the reverse link.

The 1xEV-DO reverse channel consists of the Access Channel and the traffic channel. The Access Channel consists of a pilot channel and a data channel, while the traffic channel consists of a Pilot Channel, a Medium Access Control (MAC) Channel, an Acknowledgement Channel, and a Data Channel. The Traffic MAC Channel contains a Reverse Rate Indicator (RRI) Channel and a Data Rate Control (DRC) Channel.

The Access Channel is employed by the Access Terminal to initiate communication with the Access Network or to respond to an Access Terminal directed message. The Access Channel consists of a Pilot Channel and a Data Channel. An access probe consists of a preamble followed by an Access Channel data packet. Only the Pilot Channel is transmitted during the pre-amble transmission, but both the Pilot Channel and the Data Channel are transmitted during the Access Channel data packet transmission.

The reverse link Traffic Channel, used by the Access Terminal to transmit user-specific traffic or signaling information to the Access Network, consists of a Pilot Channel, a MAC Channel, an Ackowledgement (ACK) Channel, and a Data Channel, with the MAC Channel containing a DRC Channel and an RRI Channel. The ACK Channel is used by the Access Terminal to inform the Access Network whether the data packet transmitted on the Forward Traffic Channel has been successfully received.

Figure 3:
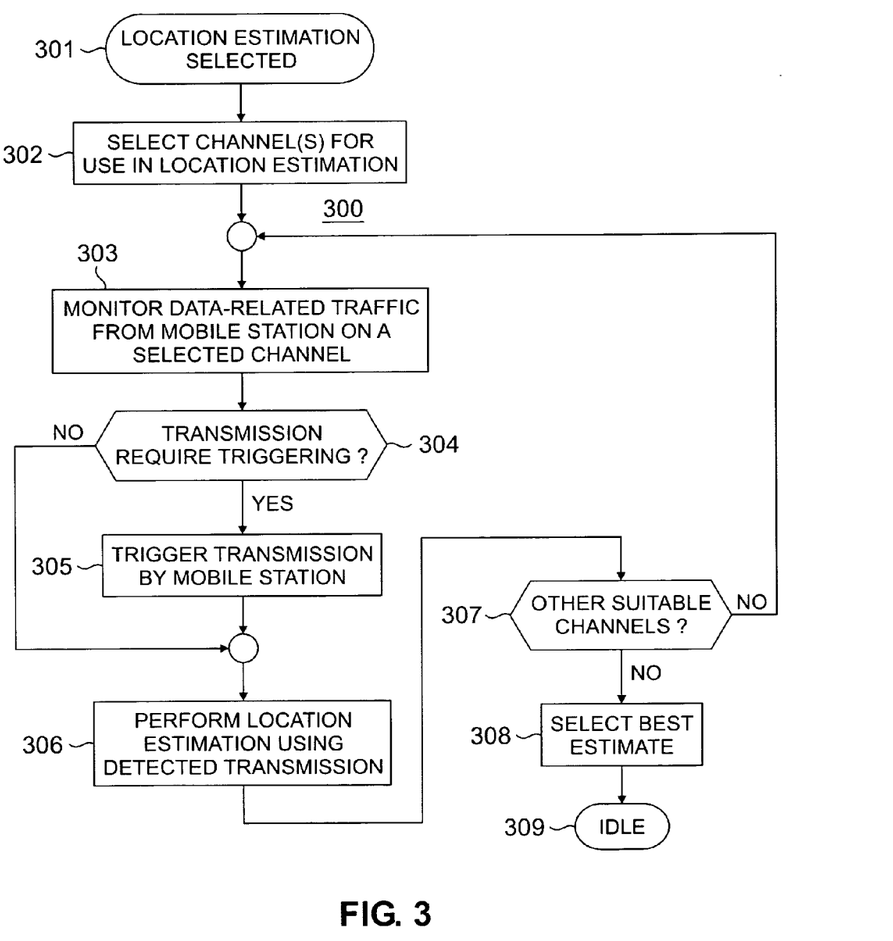
FIG. 3 is a high level flowchart for a process of implementing and employing location estimation based upon wireless data communications according to one embodiment of the present invention.

FIG. 3 illustrates the reverse link channel structure. The reverse link provides a Reverse Rate Indictor (RRI) which aids the Access Point in determining the rate at which the reverse link is sending data and is included as the preamble for reverse link frames, indicating the rate at which the data was sent.

The Access Terminal continuously updates the Access Point on the DRC Channel, indicating a specified data rate to be utilized on the forward link. The Access Terminal also informs the system which Access Point has the best carrier-to-interference (C/I) channel condition and is therefore most suitable for transmitting to the subscriber on the forward link.

Table III below specifies the data rates supported by the 1xEV-DO reverse link:

TABLE III

| | Physical Layer Parameters | | | | |
| --- | --- | --- | --- | --- | --- |
| Data Rates (kbps) | 9.6 | 19.2 | 38.4 | 76.8 | 153.6 |
| Modulation Type | BPSK | BPSK | BPSK | BPSK | BPSK |
| Bits per Encoder Packet | 256 | 512 | 1024 | 2048 | 4096 |
| Code Rate | ¼ | ¼ | ¼ | ¼ | ½ |
| Encoder Packet Duration (ms) | 26.67 | 26.67 | 26.67 | 26.67 | 26.67 |
| Number of Slots | 16 | 16 | 16 | 16 | 16 |

The data rate of the Access Channel is fixed at 9.6 kbps.

It should be noted that the term "wireless data communications signals," as used herein, is not limited to actual data signals, but includes any wireless signal related to data communications including, for example, pilot signals, RRI signals, etc.

While the reverse pilot channel and the enhanced access channel are good candidates for use in location estimation in IS2000 systems, other channels may be selected for location estimation provided they do not carry signaling information or, if they do carry signaling information, any signal variance does not cause unacceptable variability of the channel. For instance, the fundamental channel and the dedicated control channel may also be employed for correlation processing, provided the information which those channels carry does not cause a lot of variance within the respective channels. Reverse common channels, reverse supplemental channels, reverse traffic channels may alternatively be employed, provided the integration time is large and the SNR is good enough to produce good results.

In the case of 1×EV-DO, the access terminal (mobile station) 101 uses an access probe consisting of a preamble followed by an access channel data packet when attempting to access a wireless data network. The access terminal 101 measures the carrier/interference (C/I) ratio with two or more available access points (base stations) 102a and 102b, and requests data from the access point providing the best connection. The power of the pilot channel during the preamble transmission is typically much greater than the power for the ordinary data transmission. Therefore the pilot channel, and particularly the access probe preamble, may be employed for location estimation.

The reverse link traffic in 1×EV-DO systems includes the pilot channel, the media access control (MAC) channel, and the acknowledgement (ACK) channel, each of which may be employed for location estimation. The identified control and signaling channels present a large SNR and long integration time (generally in multiples of 1.67 msec, which may produce a smaller location estimation error.

The use of signals triggering a responsive acknowledgement by the mobile station (access terminal) 101 as described above for SMS systems may also be found or implemented within IS2000 and ancillary systems, including 1×EV-DO and 1×EV-DV systems. Moreover, location estimator may employ more than one channel for location estimation, selecting results presenting the smallest location estimation error.

FIG. 3 is a high level flowchart for a process of implementing and employing location estimation based upon wireless data communications according to one embodiment of the present invention. The process 300 begins with selection of location estimation capabilities for inclusion within a wireless data or voice/data communications system (step 301). One or more channels on which data traffic-related signals are transmitted from the mobile station (or access terminal) under the applicable standard is selected (step 302).

Data traffic-related signals from the mobile station on at least one of the selected channels is monitored (step 303). Optionally a determination is made of whether data-related transmission by the mobile station requires triggering (step 304), and if necessary such triggering of transmission is performed (step 305), such as by transmitting a data signal requiring acknowledgement by the mobile station as described above.

Wireless data communications-related signals by the mobile station are employed to perform location estimation (step 306). Optionally a determination may be made of whether other suitable channels exist which may produce a better location estimate (step 307), and the best estimate from using various channels is selected (step 308). Location estimation using multiple channels may be performed sequentially or concurrently on all suitable channels, or in some combination thereof. Once a location estimate is produced, or the best location estimate produced is selected, the process becomes idle until location estimation is again activated (step 309).

The present invention allows location estimation to be performed for wireless data communications without requiring special equipment or substantially modifying existing location estimation algorithms. By selection of appropriate channels for a given wireless data communications system, triggering of wireless data signal transmission by the mobile station to be located, if necessary, and/or selection of best location estimates, location estimation for wireless data communications may be reliably performed.

It is important to note that while the present invention has been described in the context of a fully functional communications device or system, those skilled in the art will appreciate that the mechanism of the present invention is capable of being implemented and distributed in the form of a computer usable medium of instructions in a variety of forms, and that the present invention applies equally regardless of the particular type of signal bearing medium is used to carry out the distribution. Examples of suitable computer usable mediums include: nonvolatile, hard-coded or programmable type mediums such as read only memories (ROMs) or erasable, electrically programmable read only memories (EEPROMs), recordable type mediums such as floppy disks, hard disk drives, and read/write (R/W) compact disc read only memories (CD-ROMs) or digital versatile discs (DVDs), and transmission type mediums such as digital and analog communications links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. For use in a wireless communications system, an apparatus comprising:
    an input receiving wireless data communications signals on a selected channel from a mobile station; and
    a location estimator coupled to the input and processing the received wireless data communications signals to generate a location estimate for the mobile station, wherein the selected channel is selected based upon one or more of signal to noise ratio, signal variability and signal duration of the wireless data communications signals from the mobile station, and wherein the signal to noise ratio of the wireless data communications signals from the mobile station on the selected channel enables a coherent integration time sufficient to reduce location estimation error over other wireless data communications signals from the mobile station on other channels.

2. The apparatus according to claim 1, wherein the signal to noise ratio of the wireless data communications signals from the mobile station on the selected channel enables a reduction in location estimation error over other wireless data communications signals from the mobile station on other channels.

3. The apparatus according to claim 1, wherein the selected channel is one or more of:
    an access channel for a Short Message Service (SMS) wireless data communications system;
    a reverse pilot channel or an enhanced access channel for an IS2000 wireless communications system; and a reverse link traffic channel for a 1×EV-DO or 1×EV-DV wireless communications system.

4. The apparatus according to claim 1, wherein the selected channel is selected based upon a power level of at least a portion of the wireless data communications signals from the mobile station on the selected channel, the power level of the wireless data communications signals from the mobile station on the selected channel enabling reduction in location estimation error over other wireless data communications signals from the mobile station on other channels.

5. The apparatus according to claim 1, wherein the location estimator is within or coupled to a base station controller, the base station controller transmitting a wireless data communication signal on a paging channel to the mobile station with an acknowledgement required field asserted to trigger transmission of a wireless data communication signal by the mobile station on an access channel.

6. A wireless communications system, comprising:
one or more base stations each coupled to a controller;
an input associated with each controller for receiving wireless data communications signals on a selected channel from a mobile station; and
a location estimator coupled to the input and processing the received wireless data communications signals to generate a location estimate for the mobile station, wherein the selected channel is selected based upon one or more of signal to noise ratio, signal variability and signal duration of the wireless data communications signals from the mobile station, and wherein the signal to noise ratio of the wireless data communications signals from the mobile station on the selected channel enables a coherent integration time sufficient to reduce location estimation error over other wireless data communications signals from the mobile station on other channels.

7. The wireless communications system according to claim 6, wherein the signal to noise ratio of the wireless data communications signals from the mobile station on the selected channel enables a reduction in location estimation error over other wireless data communications signals from the mobile station on other channels.

8. The wireless communications system according to claim 6, wherein the selected channel is one of:
an access channel for a Short Message Service (SMS) wireless data communications system;
a reverse pilot channel or an enhanced access channel for an IS2000 wireless communications system; and
a reverse link traffic channel for a 1×EV-DO or 1×EV-DV wireless communications system.

9. The wireless communications system according to claim 6, wherein the selected channel is selected based upon a power level of at least a portion of the wireless data communications signals from the mobile station on the selected channel, the power level of the wireless data communications signals from the mobile station on the selected channel enabling reduction in location estimation error over other wireless data communications signals from the mobile station on other channels.

10. The wireless communications system according to claim 6, wherein the location estimator is within or coupled to the base station controller, the base station controller transmitting a wireless data communication signal on a paging channel to the mobile station with an acknowledgement required field asserted to trigger transmission of a wireless data communication signal by the mobile station on an access channel.

11. For use in a wireless communications system, a method of location estimation comprising:
receiving wireless data communications signals on a selected channel from a mobile station;
processing the received wireless data communications signals to generate a location estimate for the mobile station; and
selecting the selected channel based upon one or more of signal to noise ratio, signal variability and signal duration of the wireless data communications signals from the mobile station, wherein the signal to noise ratio of the wireless data communications signals from the mobile station on the selected channel enables a coherent integration time sufficient to reduce location estimation error over other wireless data communications signals from the mobile station on other channels.

12. The method according to claim 11, wherein the signal to noise ratio of the wireless data communications signals from the mobile station on the selected channel enables a reduction in location estimation error over other wireless data communications signals from the mobile station on other channels.

13. The method according to claim 11, wherein the step of selecting the selected channel based upon one or more of signal to noise ratio, signal variability and signal duration of the wireless data communications signals from the mobile station further comprises one of:
selecting an access channel for a Short Message Service (SMS) wireless data communications system;
selecting a reverse pilot channel, an enhanced access channel, or both for an IS2000 wireless communications system; and
selecting a reverse link traffic channel for a 1×EV-DO or 1×EV-DV wireless communications system.

14. The method according to claim 11, further comprising:
transmitting a wireless data communication signal on a paging channel to the mobile station with an acknowledgement required field asserted to trigger transmission of a wireless data communication signal by the mobile station on an access channel.

* * * * *

UNITED STATES PATENT AND TRADEMARK OFFICE
CERTIFICATE OF CORRECTION

PATENT NO. : 7,016,692 B2  Page 1 of 1
APPLICATION NO. : 10/102292
DATED : March 21, 2006
INVENTOR(S) : Purva R. Rajkotia It is certified that error appears in the above-identified patent and that said Letters Patent is hereby corrected as shown below:

Column 4, line 4, delete "($ACK_{13}REQ$)" and replace it with -- (ACK_REQ) --.

Signed and Sealed this

Seventeenth Day of October, 2006

JON W. DUDAS
*Director of the United States Patent and Trademark Office*